May 25, 1937.　　　W. J. RADY　　　2,081,837

GENERATOR REGULATOR

Filed July 12, 1934

INVENTOR
William J. Rady
BY
His ATTORNEYS

Patented May 25, 1937

2,081,837

UNITED STATES PATENT OFFICE 2,081,837

GENERATOR REGULATOR

William J. Rady, Anderson, Ind., assignor to General Motors Corporation, Detroit, Mich., a corporation of Delaware Application July 12, 1934, Serial No. 734,715

9 Claims. (Cl. 171—223)

This invention relates to the regulation of variable speed generators, particularly generators used on automotive vehicles.

The object of this invention is to provide a system of regulation for variable speed generators which is of simple construction, efficient and durable in operation and can be manufactured at relatively low cost. These objects are accomplished by employing a vibratory regulator which controls the current in the main exciting field of the generator by intermittently reducing a resistance in the main field circuit. In order that a generator may be regulated satisfactorily at high speed by the use of a relatively low resistance with parallel contacts of the regulator, the generator is provided with a bucking field or field which opposes the main exciting field. At high speeds the bucking field operates to reduce the total flux and thereby makes it possible to use relatively low resistance in the regulator circuit; and the use of the small resistance increases the frequency of the regulator and makes the frequency more nearly uniform throughout the speed range. The connections between the bucking field and the generator armature are such that, at lower speeds, the bucking field does not materially oppose the main field.

Further objects and advantages of the present invention will be apparent from the following description, reference being had to the accompanying drawing wherein a preferred embodiment of one form of the present invention is clearly shown.

Figure 1:
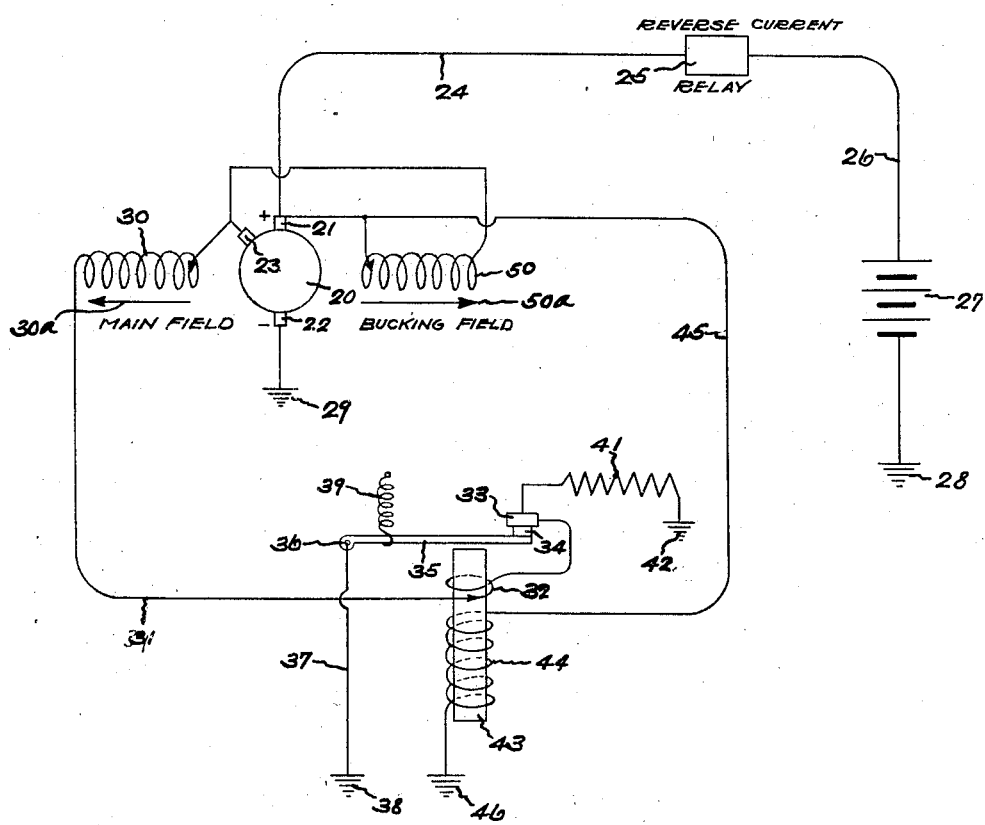
Fig. 1 is a wiring diagram illustrating one form of the present invention.

Referring to Fig. 1, 20 designates the generator having an insulated main brush 21, a grounded main brush 22, and a third or auxiliary brush 23. The main brush 21 is connected by a wire 24 with a reverse-current or cut-out relay 25 connected by a wire 26 with battery 27 grounded at 28 and then connected through ground 29 with a brush 22. The main exciting field 30 is connected with the third brush 23 and by wire 31 with a magnet coil 32 connected to a contact 33 which is engageable with contact 34 carried by an armature 35 which is hinged at 36 and is connected by wire 37 with ground 38. A spring 39 urges the contact 34 carried by armature 35 against the contact 33. A resistance 41 connected with contact 33 and ground 42 is located in parallel with the relay contacts 33 and 34. Coil 32 surrounds a relay core 43 surrounded also by a main relay coil 44 connected by wire 45 with the main brush 21 and grounded at 46. Between main brush 21 and the auxiliary brush 23, there is connected a field winding 50 known as the bucking field since the flux produced thereby opposes that produced by the main field 30. The relation of the fluxes of field windings 30 and 50 is represented by arrows 30a and 50a.

It is apparent that the generator will be regulated through the vibratory action of the armature 35 which breaks and makes the short circuit around the resistance 41. Within a certain range of lower speeds the main field supplies the generator flux without material interference from the bucking field 50, since the bucking field 50 is connected between the brushes 23 and 21 instead of between the brushes 21 and 22 and the voltage impressed upon the bucking field at low speeds is relatively low. As the speed of the generator increases above a certain low speed range the voltage between the brushes 23 and 22 decreases while the voltage between the brushes 21 and 22 increases. Therefore, the current in the main field decreases while the current in the bucking field increases. Therefore, at high speeds the bucking field is operative to materially reduce the flux of the generator and hence make possible the regulation of the generator without requiring the use of a high resistance in the resistance unit 41.

If the bucking field were not used it would be necessary to use a high resistance at 41 in order to secure regulation at high speeds. If the resistance at 41 is not great enough to take care of high speed operation, when a certain high speed is exceeded, the contacts after having been opened would stay open because the resistance 41 would fail to effect a voltage drop and hence the decrease in flux of the magnet of the regulator such as to permit the spring 39 to close the contacts 33 and 34. If the regulator contacts were to remain open further speed increase would cause a rise in voltage. If the resistance at 41 is made large enough to take care of high generator speed, then this resistance would be unnecessarily large for the lower speeds. The use of a high resistance at 41 cuts down the main field current at lower speeds more than is necessary for purpose of regulation and hence, causes undue arcing at the regulator contacts and reduces the frequency of the regulator armature vibrations, thereby causing the voltage of the generator to fluctuate between relatively wide limits. But, because the bucking field permits the use of a relatively low resistance, at 41, the frequency of vibration of the regulator is increased and the frequency is more nearly uniform throughout the range of speed of the generator.

Since the bucking field is connected between the third brush and the nearest main brush, it can be provided with sufficient ampere turns to take care of regulation at very high speeds without materially hindering the effectiveness of the main field at low speed. If the bucking field were connected across the main brushes, its ampere turns would need to be reduced to such value that the bucking field would not interfere with the main field at low speeds, hence such a bucking field would not be so effective to reduce the total flux at high speed.

Figure 2:
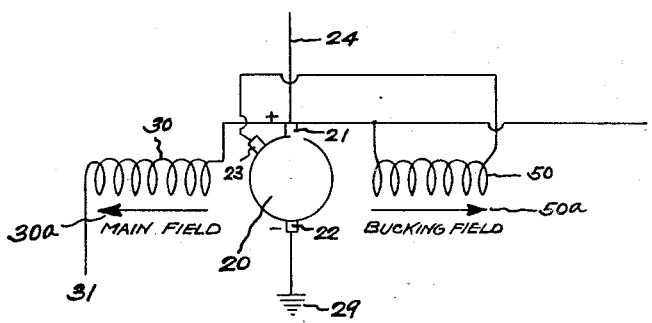
Fig. 2 is a fragmentary diagram illustrating another form of the invention.

According to Fig. 2, the main field winding is connected across the main brushes, while the bucking field winding is connected between brushes 21 and 23 as before. With such arrangement the voltage impressed upon the bucking field 50 increases with speed increase, at a rate greater than in the case of Fig. 1. Hence the bucking field 50 could have fewer turns than the field 50 of Fig. 1 and still be as effective as before. The arrangement shown in Fig. 2 is particularly adapted to a regulating system using a current regulator in addition to the voltage regulator. With the proper setting of the auxiliary or third brush 23, it is possible to effect regulation without a current regulator.

A part of the excitation of the regulator magnet is derived from the winding 32 which is connected in series with the regulator contacts 33 and 34. When these contacts are opened the current in the winding 32 is materially reduced by the resistance 41, hence the decrease in flux of the regulator magnet takes place more quickly, thereby increasing the speed of the regulator armature 35. This reduces the range of fluctuation of the voltage to limits which are narrower than possible without this arrangement.

While the embodiments of the present invention as herein disclosed constitute preferred forms, it is to be understood that other forms might be adopted, all coming within the scope of the claims which follow.

What is claimed is as follows.

1. In a system of regulation for a generator having a pair of main brushes, a third brush and a main field winding in circuit with the third brush, the combination of a resistance in circuit with the main field winding, a vibratory regulator traversed by the current in said field winding which intermittently cuts in and out the resistance in the third brush field circuit and a generator field winding connected between the third brush and nearest main brush of the generator bucking said main field winding.

2. The combination defined by claim 1 further characterized by the fact that the regulator has a magnet winding in series with the main field winding and the regulator contacts.

3. The combination defined by claim 1 further characterized by the fact that the main field winding of the generator is connected between the third brush and the furthest main brush.

4. The combination defined by claim 1 further characterized by the fact that the main field winding of the generator is connected in series with the said generator field winding across the main brushes.

5. In a system of regulation for a generator having a pair of main brushes, a third brush, and a main field winding connected to one of said brushes, the combination of a field winding permanently connected directly across the third brush and the nearest main brush bucking said main field winding, a resistance normally in circuit with the main field winding, and a vibratory regulator responsive to the output of the generator which intermittently cuts in and out the resistance in the main field winding circuit.

6. In a system of regulation for a generator having a third brush, and a main field winding connected to the third brush, the combination of a field winding connected directly across the third brush and the nearest main brush and bucking the main field winding, a small resistance in circuit with the main field winding, and a vibratory regulator which intermittently cuts in and out the resistance in the main field winding circuit in response to variations in generator output.

7. In a system of regulation for a generator having a pair of main brushes, a third brush, and a main field winding connected to one of said brushes, the combination of a field winding permanently connected across the third brush and the nearest main brush and arranged to buck the main field winding, a resistance normally in circuit with the main field winding, and a vibratory regulator having a magnet coil interposed between the main field winding and the resistance, which intermittently cuts in and out the resistance in the main field winding circuit.

8. In a system of regulation for a generator having a pair of main brushes, a third brush, a resistance and a main field winding connecting the resistance with the third brush, the combination of a field winding permanently connected directly across the third brush and the nearest main brush so as to buck the main field winding, and a regulator inserted in circuit with the main field winding which intermittently cuts in and out the resistance in the main field winding circuit in response to current variations in the main field winding.

9. In a system of regulation for a generator having a pair of main brushes, a third brush and a main field winding connected across the main brushes, the combination of a resistance in circuit with the main field winding, a vibratory regulator traversed by the current in said field winding which intermittently cuts in and out the resistance in the main brush field circuit and a generator field winding connected between the third brush and nearest main brush of the generator bucking said main field winding.

WILLIAM J. RADY.